UNITED STATES PATENT OFFICE.

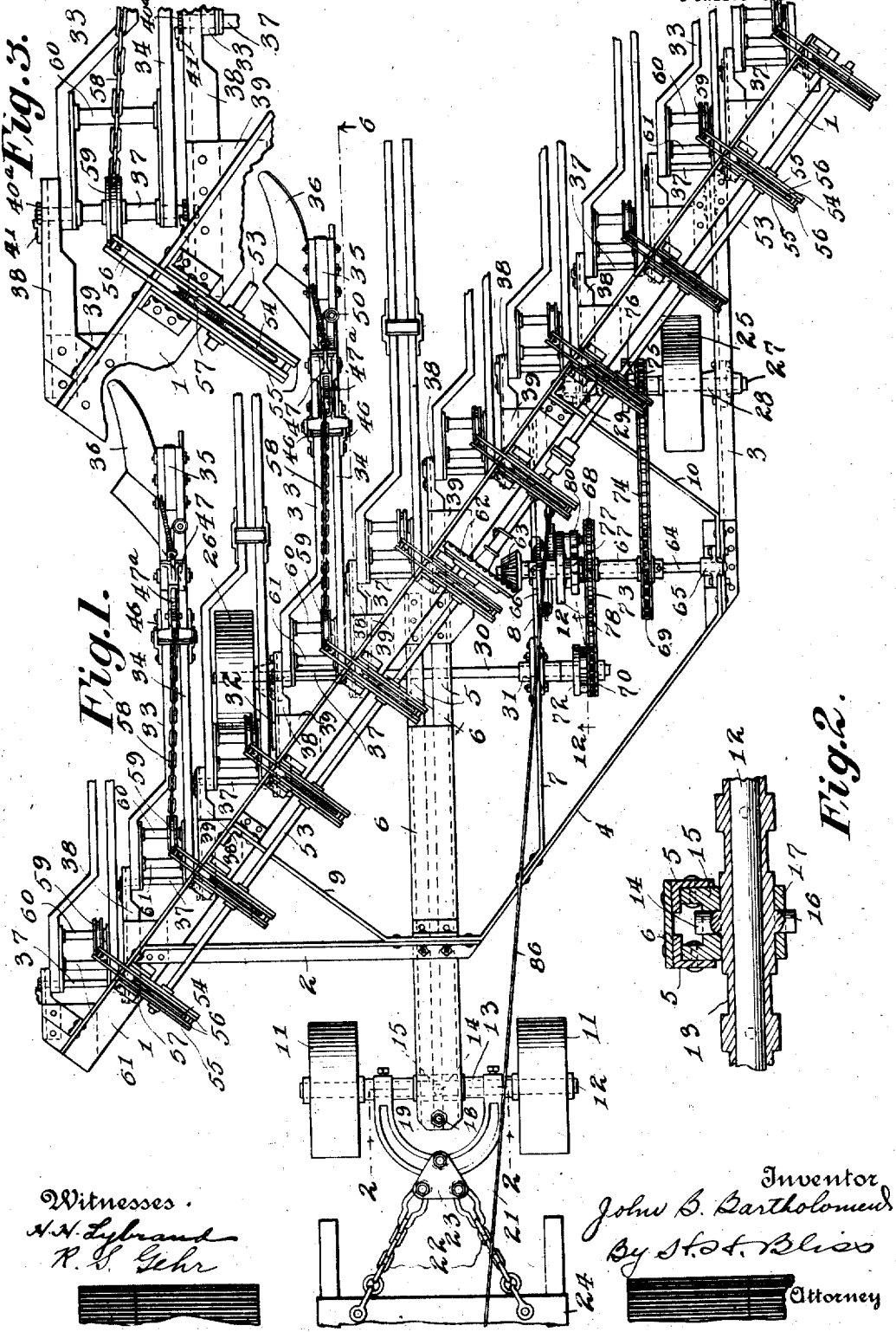

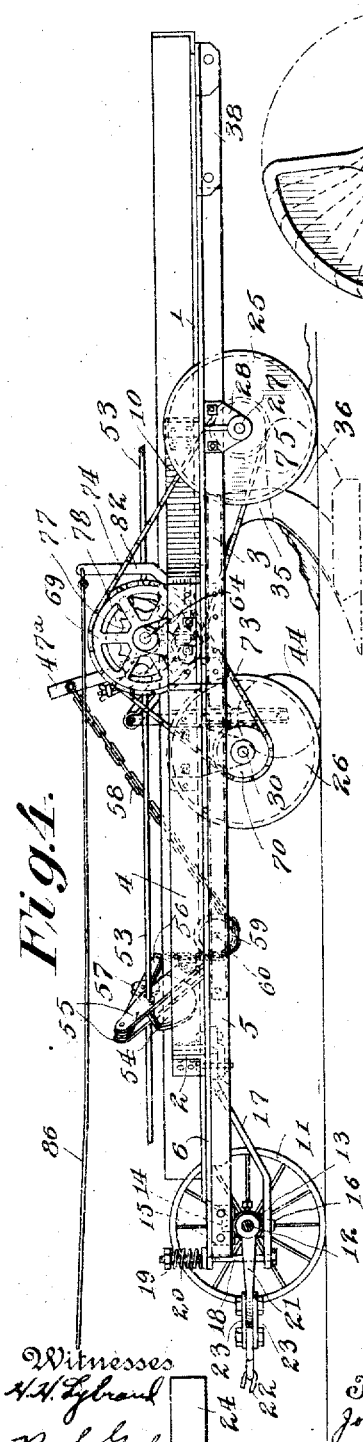

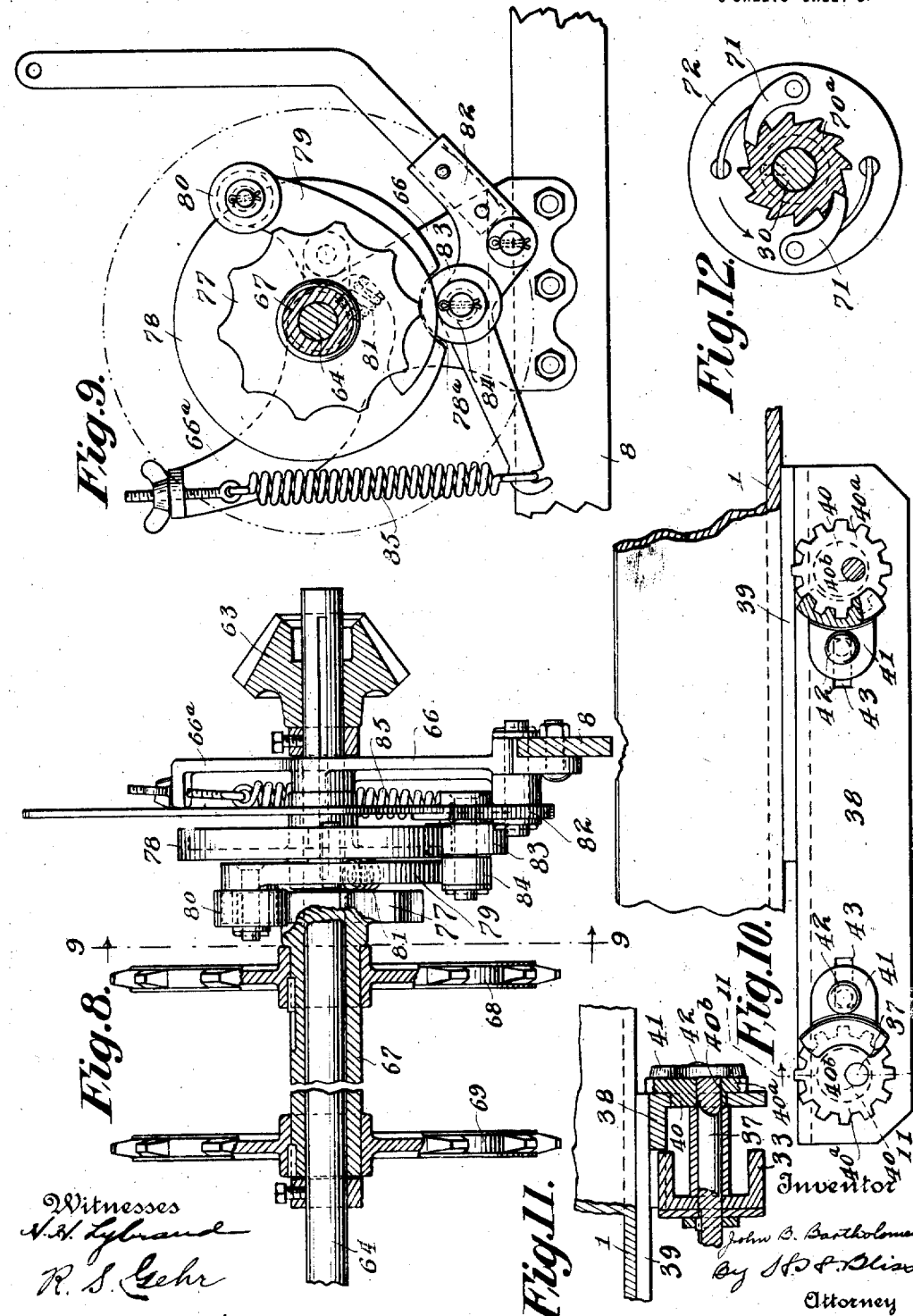

JOHN B. BARTHOLOMEW, OF PEORIA, ILLINOIS, ASSIGNOR TO AVERY COMPANY, A CORPORATION OF ILLINOIS.

GANG-PLOW.

1,257,446.   Specification of Letters Patent.   Patented Feb. 26, 1918.

Application filed January 18, 1912, Serial No. 671,955. Renewed July 19, 1917. Serial No. 181,664.

*To all whom it may concern:*

Be it known that I, JOHN B. BARTHOLOMEW, a citizen of the United States, residing at Peoria, in the county of Peoria and State of Illinois, have invented certain new and useful Improvements in Gang-Plows, of which the following is a specification, reference being had therein to the accompanying drawing.

The invention relates to gang plows of the type which are adapted and designed to be drawn by a traction engine. Such plows have a main frame suitably supported from the ground and a series or gang of plows coupled to the main frame so as to be drawn by it. The individual plows are necessarily arranged in a series oblique to the lines of draft and for this reason the plows must be lifted from the ground in succession if their furrows are to end on the same transverse line. It has been proposed heretofore to provide power devices for successively lifting the plows and one of the objects of my present invention, generally stated, is the provision in a gang plow of the kind referred to of improved mechanism for effecting the lifting of the plows.

Some of the features of improvement relate to the construction and arrangement of the lifting devices, said construction and arrangement being simple and reliable in operation and such that the operation of the plows is not interfered with when passing over uneven ground.

Other objects of my invention are a provision of an improved construction of the main frame and a provision of improved devices for coupling the plows to the main frame.

In the accompanying drawings,

Figure 1 is a plan view of a plow embodying my improvements.

Fig. 2 is a vertical section taken on the line 2—2 of Fig. 1.

Fig. 3 is a fragmentary plan view of a portion of the frame and of one of the plow beams showing a different arrangement of the lifting devices than is shown in Fig. 1.

Fig. 4 is a left side elevation of the main frame and one of the plows.

Fig. 5 is a vertical section taken on the line 5—5 of Fig. 6.

Fig. 6 is a vertical section taken on the line 6—6 of Fig. 1.

Fig. 7 is a diagrammatic view showing the relative angular arrangement of the lifting cams.

Fig. 8 is a detail view of the clutch mechanism and associated parts, some of the parts being shown in vertical section and some in rear elevation.

Fig. 9 is a vertical section taken on the line 9—9 of Fig. 8.

Fig. 10 is a right side elevation of one of the brackets to which the plow beams are coupled.

Fig. 11 is a vertical section on the line 11—11 of Fig. 10.

Fig. 12 is a vertical section on the line 12—12 of Fig. 1.

The main frame of the plow is a rigid structure made up preferably of standard structural steel shapes, and, as shown, consists of an obliquely arranged angle bar or beam 1, a front transverse angle bar 2, a side angle bar 3, an obliquely disposed front bar 4 connecting the left end of the front bar 2 and the front end of the side bar 3, and central angle bars 5, 5 connected at their rear end to the beam 1 and extending forward beyond the front bar 2. These two bars 5, 5 are connected by a flat plate 6 and the resulting beamlike structure is secured to the front beam 2. Flat bars 7 and 8 extend from the diagonal bar 4 to the beam 1 and in addition carry certain shaft bearings which will be referred to later. The frame structure is further braced by diagonal bars 9 and 10.

The main frame is mounted on four ground wheels. The front wheels 11, 11 are mounted on a swinging axle 12. This axle carries a sleeve 13 having an upright trunnion 14 which fits in a bearing aperture in a bearing block 15 secured to the front end of the frame bars 5, 5. The lower side of the sleeve 13 has a depending trunnion 16 which is engaged by a brace bar 17 secured at its rear end to the main frame and supported at its front end by a bolt 18. This bolt extends upward through an aperture in the front end of the plate 6 and between the said plate and the nut 19 of the bolt is arranged a spring 20 which has the effect of drawing the brace bar 17 upward against the sleeve 13 and at the same time permitting a certain freedom of movement of the swinging axle. A curved draft bar 21 is carried by the sleeve 13 and draft chains 22, 22 are connected to the draft bar by triangular plates 23, as shown. 24 designates the rear end of the frame of a traction engine and to this frame the chains 22 are connected. It is clear that as the traction engine is turned to one side or the other the axle carrying the wheels 11 will be correspondingly swung to guide the plow frame.

The rear part of the plow frame is supported upon wheels 25, 26. The wheel 25 is mounted on a shaft 27 which is carried by bearings 28 and 29 on the main frame. The wheel 26 is mounted upon a shaft 30. The left end of this shaft is supported in a bearing 31 which is secured to and serves to rigidly connect the frame bars 7 and 8, the bar 8 being disposed in a lower plane than the bar 7 to permit it to pass under the lifting cam of one of the plows. The right end of the shaft 30 is mounted in a bearing 32 carried by one of the coupling brackets on the beam 1. The wheel 27 is disposed so that it rises between the two beam bars of one of the plows.

Each of the individual plows has a beam consisting of two parallel bars 33 and 34. The standard 35 of the plow body 36 is bolted to the rear ends of the beam bars, and the front ends of said bars are spread apart to provide for a wide pivotal connection with the main frame. This connection is effected by means of a pivot pin 37 carried by brackets or arms 38, 38 on the main frame. These brackets are preferably bolted or riveted to plates 39 which are in turn rigidly secured to the beam 1. Each bracket is in the form of an angle bar 38 having two circular apertures, one near its front end and the other near its rear end. In these apertures are mounted bearing blocks 40, 40. Each of these bearing blocks has a toothed flange 40ª and an eccentric bearing aperture 40ᵇ to receive the pivot pin 37. 41, 41 are toothed clips arranged to engage and lock the bearing blocks 40 in position, said clips being held in position by bolts 42, 42 which pass through slots 43, 43 in the bracket 38. It will be seen that the bearing aperture 40ᵇ can be adjusted forward or backward or up and down by disengaging the locking clip 41 and turning the bearing block.

By referring to Fig. 1 it will be seen that the pivot pin 37 of each plow is supported at its right end in the rear bearing of one bracket and at its left end in the front bearing of the next bracket. With the pivot pins 37 thus mounted it will be seen that the plow can have its front end bodily raised or lowered, or that the plow can be leveled or can be swung laterally to effect the even spacing of the plows.

On the beam of each plow is movably mounted a gage and lifting wheel 44. This wheel is mounted in an inverted U-shaped standard 45 which is slidably secured to the beam bars by plates 46. A lever 47 is mounted on a bracket 48 carried by the beam bars and one arm of this lever is connected by links 49 with the standard 45. Another arm of the lever 47 carries an adjustable contact screw 50 which is arranged to engage one of the beam bars and limit the upward movement of the wheel 44 relative to the beam. A spring 51 interposed between the lever 47 and the plow beam tends to draw the gage wheel 44 upward. 52 is a scraper carried by the standard 45 in position to free the wheel of soil which would tend to accumulate upon it. The lever 47 carries an arm 47ª by means of which the lever can be swung to force the wheel 44 downward or rather to cause the lifting of the beam relative to the wheel. To effect such a lifting of the beam I provide power mechanism adapted to swing the levers 47 one after the other so that the plows will be lifted in succession.

A shaft 53 is arranged obliquely on the main frame adjacent the beam 1 and on the shaft is mounted a series of segmental cams 54, one cam being disposed adjacent the front end of each plow beam. The shaft is mounted in bearings carried by a series of brackets 55 on the beam 1, these brackets being arranged in pairs with one bracket on either side of each of the cams. Each of the cams 54 has an outward and rearward curved lifting part 54ª and a circular or cylindrical part 54ᵇ, and the cams are displaced from each other angularly as shown in Fig. 7. A lever arm 56, preferably in the form of two bars is pivotally connected to the upper end of each pair of brackets 55 and carries a roller 57 adapted to ride upon the surface of the adjacent cam 54. The free end of the lever 56 is connected to one end of a chain 58 which has its other end connected to the arm 47ª of the lever 47 on the plow beam.

The chain 58 does not extend directly from the lever 56 to the lever arm 47ª but passes downward and under a guide roller or idler 59 at the front end of the plow beam. The location of this idler or roller at the front end of the beam is of considerable importance. Theoretically the location should be such that the chain 58 extending forward from the lever arm 47ª would pass through the horizontal axis on which the plow beam is pivoted to the main frame. This result is closely approximated by the construction shown in Fig. 3 where the idler 59 is mounted upon the pivot pin 37. For practical reasons, however, I prefer to mount the idler on the transverse rod 60 to the rear of the pivot pin 37, as shown in Figs. 1 and 6, as this makes it possible to bring the pivotal connection closer to the beam 1 of the main frame, and does not materially interfere with the securing of the desired result, namely, the freedom of the plow to rise and fall without interference from the chain mechanism. The rod 60, as shown in Fig. 1, serves not only to support the idler 59 but also braces the front end of the beam bars. I prefer, also to provide an additional brace rod 61 at this point.

It will now be assumed that the rotation of the shaft 53 will cause the arms 54 to successively lift the levers 56, beginning at the right side of the machine, and cause, therefore, a successive lifting of the plows from the ground, for it is obvious that the movement of the levers 56 is transmitted by the chains 58 to the levers 47 causing the front ends of said levers to swing downward relative to the beams and, therefore, the lifting of the beams relative to the ground wheels 54. The arrangement of the cams 54 on the shaft 53 is such that a half revolution of the shaft will cause the lifting of all the plows; and if then the shaft is given a further half revolution the plows will be lowered in succession in the same order in which they were lifted.

The shaft 53 carries a large bevel gear 62 and this gear is driven by a pinion 63 which is keyed on a shaft 64 rotatably mounted in bearings 65 and 66 on the main frame. A sleeve 67 is rotatably mounted on the shaft 64 and on this sleeve are keyed sprocket wheels 68 and 69. The sprocket wheel 68 is in line with a sprocket wheel 70 on the shaft 30. The sprocket wheel 70 is sleeved loosely on the shaft 30, but can be driven in one direction from the shaft by means of pawls 71, 71 carried by a wheel 72 fast on the shaft, these pawls being arranged to engage ratchet teeth 70ª on the sprocket wheel. A sprocket chain 73 connects the wheel 70 with the wheel 68. It will be seen that the rotation of the ground wheel 26 as the machine advances will cause the rotation of the sprocket wheel 68 and the sleeve 67 on which it is mounted. In a similar way the sprocket wheel 69 is arranged to be driven by the ground wheel 25 through a sprocket chain 74 which passes over a sprocket wheel 75 which is loosely mounted on the shaft 27 but which is driven therefrom through pawl and ratchet mechanism at 76 similar in all respects to the ratchet mechanism which drives the wheel 70. By providing the pawl and ratchet connections between the two ground wheels and the sleeve 67, which is to be driven therefrom, the driving power of both wheels is made use of and at the same time there is no interference of one driving wheel with the action of the other when one rotates more rapidly than the other, as when the machine is to be turned. To connect the sleeve 67 with the shaft 64 I provide a clutch mechanism which is adapted to be manually engaged to cause the operation of the plow lifting device and to be automatically disengaged when the plows have been lifted or lowered.

On the right end of the sleeve 67 is a notched or serrated disk 77 and adjacent this disk and keyed to the shaft 64 is a larger circular disk 78 formed at one point in its periphery with a rounded notch 78ª. A dog 79 is pivotally mounted on the disk 78. The head of the dog carries a laterally extending roller 80 arranged to engage with the notched periphery of the disk 77 and a spring 81, which is interposed between the hub of the disk 78 and the dog 79, tends to press the roller 80 into engagement with the disk 77. A lever 82 is pivotally mounted on the bearing bracket 66 beneath the disk 78 and carries a roller 83 adapted to ride upon the periphery of said disk. The lever also carries a roller 84 which is disposed in the plane of the dog 79. 85 is a coil spring interposed between the end of the lever 82 and an extension 66ª of the bearing bracket 66 and tends to press the roller 83 radially inward against the disk 78. The upper end of the lever 82 has connected to it a rope or cord 86 which extends forward to some convenient point on the engine platform where it can be grasped by the driver of the engine.

By referring to Fig. 9 it will be seen that when the roller 83 lies within the notch 78ª in the disk 78, the roller 84 is in position to engage the rounded back or tail of the dog 79 and swing the dog on its pivot so that the roller 80 is withdrawn from engagement with the continuously rotating clutch disk 77. If now the driver pulls on the rope 86 to swing the upper end of the lever 82 forward the rollers 83 and 84 will be swung downward and the spring 81 will expand and cause the dog 79 to swing the arm 80 into engagement with the rotating disk 77. In this way a driving connection is effected between the disk 77 and the disk 78 so that the rotation of the former is transmitted to the latter.

The rotation of the disk 78 causes the notch 78ª to be immediately moved away from the roller 83 so that when the rope 86 is released by the driver and the spring 85 tends to return the lever 82 to its initial position such return is prevented by the engagement of the roller 83 with the circular periphery of the disk 78. But as the disk 78 nears the end of its revolution the roller 83 rides suddenly into the notch 78ª under the action of the spring 85 and in this movement the roller 84 is caused to strike the tail of the dog 79 and cause the disengagement of the roller 80 from the disk 77.

Thus by a simple pull upon the cord 86 the rotation of the shaft 64 is started and at the end of a single revolution automatically stopped. As the pitch diameter of the pinion 63 is half that of the gear 62 the single revolution of the shaft 64 thus produced causes a half revolution of the cam shaft 53. As previously explained, a half revolution of the cam shaft causes the successive lifting of the several plows, and a further half revolution of said shaft effects the successive lowering of the plows. It follows, therefore, that it is only necessary to give a single pull upon the rope 86 to cause the successive lifting of the plows and that a second pull of the rope is all that is required to cause the plows to be again lowered.

When the plows have been lifted for transportation from one place to another it is desirable to relieve the cam lifting mechanism of the stresses to which they would be subjected in holding the plows up and for this purpose I provide each plow beam with a hook 87 which can be swung over the top of the standard 45. This serves to lock the beam to the standard and relieves all the other parts of the lifting mechanism.

The operation of my improved gang plow will now be readily understood. On entering the field where the machine is to be used, if the plows have been locked up by means of the hooks 87, the latter are first disengaged and then with the machine at the starting point the driver pulls upon the rope 86 which causes the engagement of the clutch mechanism. This results in a half revolution of the cam shaft 53 causing the plows to be lowered one after the other, so that they all enter the ground on substantially the same transverse line. At the end of the half revolution of the cam shaft 53 the clutch is automatically disengaged, as previously explained.

When the turning point is reached the driver has only to again pull upon the rope 86 to cause the clutch mechanism to again engage and produce a further half revolution of the cam shaft 53. During this second half revolution of the cam shaft the operative, or lifting parts of the cams come into operation to effect the successive lifting of the plows, beginning with the one on the right, and thus the plows are all lifted from the ground on substantially the same transverse line. After turning the plows are again lowered in the manner explained.

In passing over uneven or rolling ground the several plows are entirely free to rise and fall and maintain their uniform depth as determined by the gage wheels because of the peculiar arrangement of the lifting chains 58. As previously explained, each of the lifting chains in passing down under the idler 59 is caused to extend to, or approximately to, the axis around which the plow beam rises and falls. Obviously this feature of my improved construction is of advantage furthermore when the plows are lifted and the machine is to be transported from place to place.

The line of draft upon any one of the individual plows can at the same time be raised or lowered within certain limits by adjusting the eccentric pivot pin bearings in the manner previously described. Furthermore by suitably adjusting said bearings the individual plows can be leveled, and can be swung laterally, as will be readily understood.

The depth of the plowing can at any time be readily changed by simply adjusting the hand screws 50 which determine the working positions of the gage wheels relative to the beams.

I have shown in the drawings driving connections between the clutch mechanism and both of the shafts 27 and 30, but it should be understood that one only of the ground wheels may be relied upon to drive the plow lifting mechanism. Where power is taken from both of the ground wheels it is desirable to use the pawl and ratchet connections so that in turning the machine the wheel on the inside will not interfere with and cause slippage of the outside wheel.

I have above described somewhat in detail the parts of the mechanism shown in the drawings, but I wish it to be understood that I do not limit myself to such specific details either as concerns matters of construction or features of relative arrangement, as there can be modifications without departing from the essential features of the invention.

It will be seen that an apparatus embodying all of my improvements may be regarded as comprising a main draft frame (generally arranged intermediate of a power tractor and the plowing devices, proper) this frame being mounted in such way that it constantly holds the points where the plows are attached in substantially the same relations to the ground surface, this being in contradistinction from the earlier gang plow structures which embody a duplex link system, or its equivalent, between the draft frame and the series of plow bodies, such system having, for each plow, two or more hinging lines or flexing lines, so that the front end of the beam, as well as its rear end, was permitted to rise, or fall, more or less at the times when the plow bodies were raised or lowered.

It will be further seen that each of the plow units has (1st) the plow body which is held so as to vibrate vertically in fixed arcs in relation to the line of connection to the main frame, (2nd) a beam which carries the body and is hinged to the frame, (3rd) a ground contacting device (here a wheel) by which the body and the rear end of the beam are supported and by which the body can also be lifted, and (4th) a power transmitter carried by the beam and mounted thereon in such way that the beam can fall below or rise above its normal working line without materially affecting the relative positions of the body and the body support.

I prefer to employ, in combination with the devices just specified, the others that have been above described; such as the depth adjuster, the stopping device which prevents the wheel or ground support from rising beyond a predetermined limit relatively to the body, but which, at the same time, permits the power mechanism to, at any instant, move the wheel relatively downward. This is in contradistinction from those constructions in which there is a two-way lock interposed between the wheel or ground support and the beam and preventing any motion of the wheel in either direction until the lock is open. I also prefer to combine with the other parts a spring such as that described, at 51, which tends to move the wheel and the plow body apart; permitting the body to quickly sink to its predetermined depth in the earth after it has been lowered from a suspended position. This spring acts to hold the parts together and prevent their separation by jolting or jarring when the parts are in motion. Its action is the opposite of the action of the springs that have heretofore been used or proposed for use between levers and plow beams and arranged to draw the levers forward and force the wheels downward.

The power transmitter (consisting of the devices here selected as typical, the chain 58 and the lever 47, 47ª) is so mounted in relation to the body and the wheel, or ground support, that the said last two parts can move upwardly or downwardly without departing from their predetermined fixed relation to each other. That is to say, the beam, together with the wheel and the plow body, can follow the surface of the ground upward or downward or along the normal horizontal planes without variations in the distance between the wheel and the body, and consequently, the latter will maintain its predetermined depth of work. The power transmitter is inactive while it is so working. This is in contrast with earlier constructions in which the chain, link, rod, cable, or equivalent for exerting tension or transmitting power to the parts on the rear end of the beam extend directly backward or upward from power devices on the main frame to the moving devices on the beam.

In those mechanisms the departures of the beam and its attachments from the predetermined normal plane of action were immediately followed by variations in the relative positions of the wheel and the plow body. That is to say, the power devices or the power transmitter was constantly liable to exert pressure on the ground wheel and lift upward the body somewhat, thus causing shallower plowing. By arranging the power transmitting parts in such way that one of the principal fulcra is close to the front end of the beam, the effect (in respect to the vertical movements of the beam, the body and the wheel) is substantially the same as if the power mechanism, or prime motor, were mounted directly on the beam so as to abut, or having a bearing, against the latter when exerting power to effect the lifting of the plow body. I prefer to mount a common prime power device for all the units on the main frame because of the greater ease of control and the possibility of employing heavier and more durable parts; but even when so arranged, it will be seen that the transmitting device of each unit having abutments on the beam arranged in the way described does not vary the relations of the wheel and body, substantially, either when the body is at work in the ground or when it is elevated and insures that these two parts shall be held at proper distances from each other and in proper relation to the ground surface when the plow body is in its elevated position on the wheels.

There is, necessarily, a slight amount of slack in the chain, and whether it is carried down directly to, and backward from, the beam axis, or is carried around a sheave an inch or two distant, the factor of slack is regulated, so that there shall be sufficient tautness to insure a quick picking up of the power transmitter when it is desired to instantly start the plow upward out of the ground and, at the same time, so that there shall not be such tautness as to prevent the beam from freely moving from its normal predetermined plane, either downward or upward, without imparting power to the ground wheel or causing this wheel and the plow body to move in relation to each other.

While I have shown the power transmitter as being made of short chain links, it will be readily understood that other well-known devices can be substituted, such as cables or a link series in which the elements were flexibly coupled rods longer, from center to center, than the links of an ordinary chain, such as is illustrated.

What I claim is:

1. In a gang plow, the combination of a main frame, an obliquely arranged series of individual plows each having a beam pivotally connected to the main frame and each having a ground wheel and a device on the beam connected with the ground wheel for moving the beam up or down with respect thereto, plow lifting mechanisms on the main frame, one for each plow, connecting devices between the several lifting mechanisms and the corresponding moving devices on the beams, each connecting device comprising two parts each disposed in a line extending approximately through the pivotal axis of the corresponding beam connection, one of the parts being mounted to swing with the beam and the other being held against such swinging movement, and means for successively actuating the several lifting mechanisms to lift the plows in succession, substantially as set forth.

2. In a gang plow, the combination of a main frame, an obliquely arranged series of individual plows each having a beam pivotally connected to the main frame and each having a ground wheel and a device on the beam connected with the ground wheel for moving the beam up or down with respect thereto, plow lifting mechanisms on the main frame, one for each plow, chains for connecting the several lifting mechanisms and the corresponding moving devices on the beams, guide sheaves for the chains, each sheave being disposed at or near the pivotal connection of the corresponding beam with the main frame, and means for successively actuating the several lifting mechanisms to lift the plows in succession, substantially as set forth.

3. In a gang plow, the combination of a main frame, an obliquely arranged series of individual plows each having a beam pivotally connected to the main frame and each having a ground wheel and a lever pivoted on the beam and connected to the ground wheel, whereby the beam is moved up or down with respect to the ground wheel when the lever is moved; a series of levers pivoted on the main frame, one lever being provided for each plow, chains for connecting the several levers on the frame with the corresponding levers on the beams, guide sheaves for the chains, each sheave being disposed at or near the pivotal connection of the corresponding beam with the main frame, and means for successively actuating the several levers on the main frame to lift the plows in succession, substantially as set forth.

4. In a gang plow, the combination of a main frame, an obliquely arranged series of individual plows each having a beam pivotally connected to the main frame and each having a ground wheel and a device on the beam movable along longitudinal lines and connected with the ground wheel for moving the beam up or down with respect thereto, an obliquely arranged series of plow lifting mechanisms on the main frame, one mechanism being provided for each plow and each mechanism having a power transmitting element movable in an oblique vertical plane, a series of connecting devices between the power transmitting elements of the several lifting mechanisms and the corresponding moving devices on the beams, each of the said connecting devices having two parts, one disposed in a longitudinal plane and connected to the movable device on the beam and the other disposed in an oblique plane and connected to the power transmitting element of the lifting mechanism, and means for actuating the several lifting mechanisms to lift the several plows in succession, substantially as set forth.

5. In a gang plow, the combination of a main frame, an obliquely arranged series of individual plows each having a beam pivotally connected to the main frame and each having a ground wheel, and a lever pivoted on the beam for movement in a vertical longitudinal plane and connected with the ground wheel for moving the beam up or down with respect thereto, an obliquely arranged series of levers pivoted on the main frame for movement in oblique vertical planes, one lever being provided for each plow, a series of chains for connecting the several levers on the frame with the corresponding levers on the beams, means for guiding the chains to hold the parts connected to the beam levers in the longitudinal planes of the said levers and to hold the parts connected to the frame levers in the oblique planes of the said levers, and means for successively actuating the several frame levers to lift the plows in succession, substantially as set forth.

6. In a gang plow, the combination of a main frame, an obliquely arranged series of individual plows each having a ground wheel, and a lever pivoted on the beam for movement in a vertical longitudinal plane and connected with the ground wheel for moving the beam up or down with respect thereto, an obliquely arranged series of levers pivoted on the main frame for movement in oblique vertical planes, one lever being provided for each plow, a series of chains for connecting the several levers on the frame with the corresponding levers on the beams, guide sheaves for the chains, one sheave being provided for each chain at a point at or near the pivotal connection of the corresponding beam with the main frame, each chain extending downward from its main frame lever to the sheave and backward and upward from the sheave to the beam lever, and means for successively actuating the several frame levers to lift the plows in succession, substantially as set forth.

7. The combination with the draft frame, of the plow units in a transverse series and adapted to be successively raised and lowered, each unit having a beam hinged to the frame, a plow body vibrating vertically in fixed arcs, a ground-engaging body-supporting device movable vertically relatively to the plow body and limited as to its relative upward movements and a power transmitting device connected to the said body-supporting device for moving it and having an abutment on the beam and being inactive at points between said abutment and the body-supporting device when the plow body is in predetermined normal working position, and automatically acting means for imparting power to said transmitters successively.

8. The combination with the draft frame, of the plow units in transverse series and adapted to be successively raised and lowered, each unit having a beam hinged to the frame, a plow body vibrating vertically in fixed arcs, a body-supporting wheel movable relatively to the plow body and a power transmitter, the plow body and its supporting wheel being adapted to move around the beam pivot at a substantially fixed distance apart at all times while the transmitter is inactive, power mechanism for actuating said power transmitters, and a connector adapted to optionally connect the power mechanism and the power transmitters successively.

9. The combination with the draft frame, of the plow units in transverse series and adapted to be successively raised and lowered, each unit having a beam hinged to the frame, a plow body vibrating vertically in fixed arcs, a ground-engaging body-supporting wheel carried by the beam and adapted to be moved relatively to the plow body to elevate it and a power transmitting chain connected to said wheel and having a bearing on the beam against which it bears when applying power to the wheel, and automatically acting means for imparting power to the said chains successively.

10. The combination with the draft frame, of the plow units in transverse series and adapted to be successively raised and lowered, each unit having a beam hinged to the frame, a plow body vibrating vertically in fixed arcs, a body-supporting wheel movable relatively to the body to lift it and a power transmitting chain connected to the wheel for relatively moving it and having a bearing on the beam in front of the wheel, and automatically acting means for imparting power to the said chains successively.

11. The combination with the draft frame, of the plow units in transverse series and adapted to be successively raised and lowered, each unit having a beam hinged to the frame, a plow body vibrating vertically in fixed arcs, a body-supporting wheel, a lever mounted on the beam connected to the wheel and a power transmitting chain connected to said lever and having a bearing on the beam independently of the lever, and automatically acting means for imparting power to the said chains successively.

12. The combination with a draft frame, of the plow units in a transverse series adapted to be successively raised and lowered, each unit having a beam hinged to the frame, a plow body vibrating vertically in fixed arcs, a body-supporting wheel carried by the beam and movable relatively to the body, a power transmitter having a bearing on the beam, movable connections between said transmitter and the wheel and a stop for limiting the motion of said connections in one direction, the said connections being normally free to move in the opposite direction, and automatically acting means for causing the transmitters to successively impart body-lifting power.

13. The combination with the draft frame, of the plow units in a transverse series and adapted to be successively raised and lowered, each unit having a beam hinged to the frame, a plow body vibrating vertically in fixed arcs, a ground-engaging body-supporting device and power transmitting devices connected to the supporting device and arranged so that when inactive they do not affect the relative positions of the plow body and its support, the said supporting device being adapted to move independently of the power mechanism in the plow lifting direction, and automatically acting means for causing the power transmitters of the series to successively move their body-supporting devices, respectively.

14. The combination with the draft frame, of the plow units in a transverse series adapted to be successively raised and lowered, each unit having a beam hinged to the frame, a plow body vibrating vertically in fixed arcs, a ground-engaging body-supporting device movable relatively to the body, adjustable devices for limiting the relative motion of the body support in one direction but permitting motion thereof in the opposite direction and power devices for moving the body support under power in one direction and arranged to permit the beam to vibrate without affecting the distance between the plow body and its support, the body support being movable in the last said direction independently of the power devices, and automatically acting means for causing the power transmitters of the series to successively move their body-supporting devices, respectively.

15. The combination with the draft frame, of the plow units in a transverse series and adapted to be successively raised and lowered, each unit having a beam hinged to the frame, a plow body vibrating vertically in fixed arcs, a ground-engaging body-supporting wheel on the beam movable relatively to the plow body and power devices having a bearing on the beam and a bearing on the wheel and arranged to permit the wheel to swing in vertically fixed arcs, the said wheel being movable downward independently of the power devices, and automatically acting means for causing the power transmitters of the series to successively move their wheels, respectively.

16. The combination with the draft frame, of the plow units in a transverse series and adapted to be successively raised and lowered, each unit having a beam hinged to the frame, a plow body vibrating vertically in fixed arcs, a ground-engaging body-supporting wheel on the beam, a lever on the beam connected to the wheel and power transmission devices mounted on the beam for moving the wheel and arranged to permit free vertical movements of the beam and the wheel, the said lever on the beam being movable with the wheel in one direction independently of the power devices, and automatically acting means for causing the power transmitters of the series to successively move their wheels, respectively.

17. The combination with the draft frame, of the plow units in a transverse series adapted to be successively raised and lowered, each unit having a beam hinged to the frame, a plow body vibrating vertically in fixed arcs, a ground-engaging body-supporting wheel carried by the beam and movable relatively to the body, a lever on the beam for moving the wheel, means for regulating the depth at which the plow body can penetrate the ground relatively to the wheel, power transmission devices on the beam for moving the wheel and arranged to when inactive permit vertical movements of the wheel and body and a lever adapted to move with the wheel independently of the power devices, and automatically acting means for causing the power transmitters of the series to successively move their wheels, respectively.

18. The combination with the draft frame, of the plow units in a transverse series adapted to be successively raised and lowered each unit having a beam hinged to the frame, a plow body vibrating vertically in fixed arcs, a body-supporting wheel on the beam movable for raising the plow body, an adjustable stop for limiting the relative upward movement of the wheel and power transmission mechanism on the beam for moving the wheel, the said wheel being movable relatively to the beam under the action of the gravity of the body, and automatically acting means for causing the power transmitters of the series to successively move their wheels, respectively.

19. The combination with the draft frame, of the plow units in a transverse series adapted to be successively raised and lowered, each unit having a beam hinged to the frame, a plow body vibrating vertically in fixed arcs, a ground-engaging body-support movable relatively to the beam and a power transmitting device on the beam which while inactive permits the beam and the plow body to drop toward the ground from points above it and a spring for resisting accidental movements of the power transmitter relatively to the body, and automatically acting means for causing the power transmitters of the series to successively move their supports, respectively.

20. The combination with the draft frame, of the plow units arranged in a transverse series and adapted to be successively raised and lowered, each unit having a beam hinged to the frame, a plow body vibrating vertically in fixed arcs, a ground-engaging body support mounted relatively movably on the beam, a power transmitting device adapted to lift the body on the said ground support and hold it in elevated position and a normally inactive lock supplemental to the power device for holding the ground support in fixed relation to the beam while the plow is elevated and automatically acting means for causing the transmitters of the series to successively impart body-lifting power.

In testimony whereof I affix my signature, in presence of two witnesses.

JOHN B. BARTHOLOMEW.

Witnesses:
J. M. CALDWELL,
A. L. GREGORY.